(12) United States Patent
Clayson

(10) Patent No.: US 8,297,232 B2
(45) Date of Patent: Oct. 30, 2012

(54) BRUSH ATTACHMENT FOR PET DOOR

(76) Inventor: Phillip Scott Clayson, Anaheim, CA (US)

(*) Notice: Subject to any disclaimer, the term of this patent is extended or adjusted under 35 U.S.C. 154(b) by 28 days.

(21) Appl. No.: 12/731,470

(22) Filed: Mar. 25, 2010

(65) Prior Publication Data

US 2011/0232579 A1      Sep. 29, 2011

(51) Int. Cl.
*A01K 13/00*      (2006.01)
(52) U.S. Cl. ........................................ 119/622; 119/615
(58) Field of Classification Search .................. 119/612, 119/615, 621, 622, 664; 15/112, 160, 161, 15/246
See application file for complete search history.

(56) References Cited

U.S. PATENT DOCUMENTS

| | | | | |
|---|---|---|---|---|
| 1,582,144 A | * | 4/1926 | Pflaum | 119/658 |
| 2,865,329 A | | 12/1958 | Elliott | |
| 3,285,231 A | * | 11/1966 | Johnson | 119/658 |
| 3,949,765 A | * | 4/1976 | Vallis | 132/120 |
| 4,943,018 A | * | 7/1990 | Glaser et al. | 248/110 |
| 5,175,896 A | * | 1/1993 | Zamir | 4/606 |
| 5,176,105 A | | 1/1993 | Madden | |
| 7,353,777 B2 | * | 4/2008 | Morosin et al. | 119/612 |

* cited by examiner

*Primary Examiner* — Rob Swiatek
*Assistant Examiner* — Lisa Tsang

(57) ABSTRACT

A brush may be mounted on a typical flap-style pet door. As the pet uses the pet door, the brush may automatically sweep dirt, loose hair, leaves, grass, allergens, or other debris off the pet. The result may be both a cleaner pet and a cleaner house, as the debris may be brushed off the pet prior to the pet entering the house. The pet owner need not be present for the brush to reap its benefits.

11 Claims, 4 Drawing Sheets

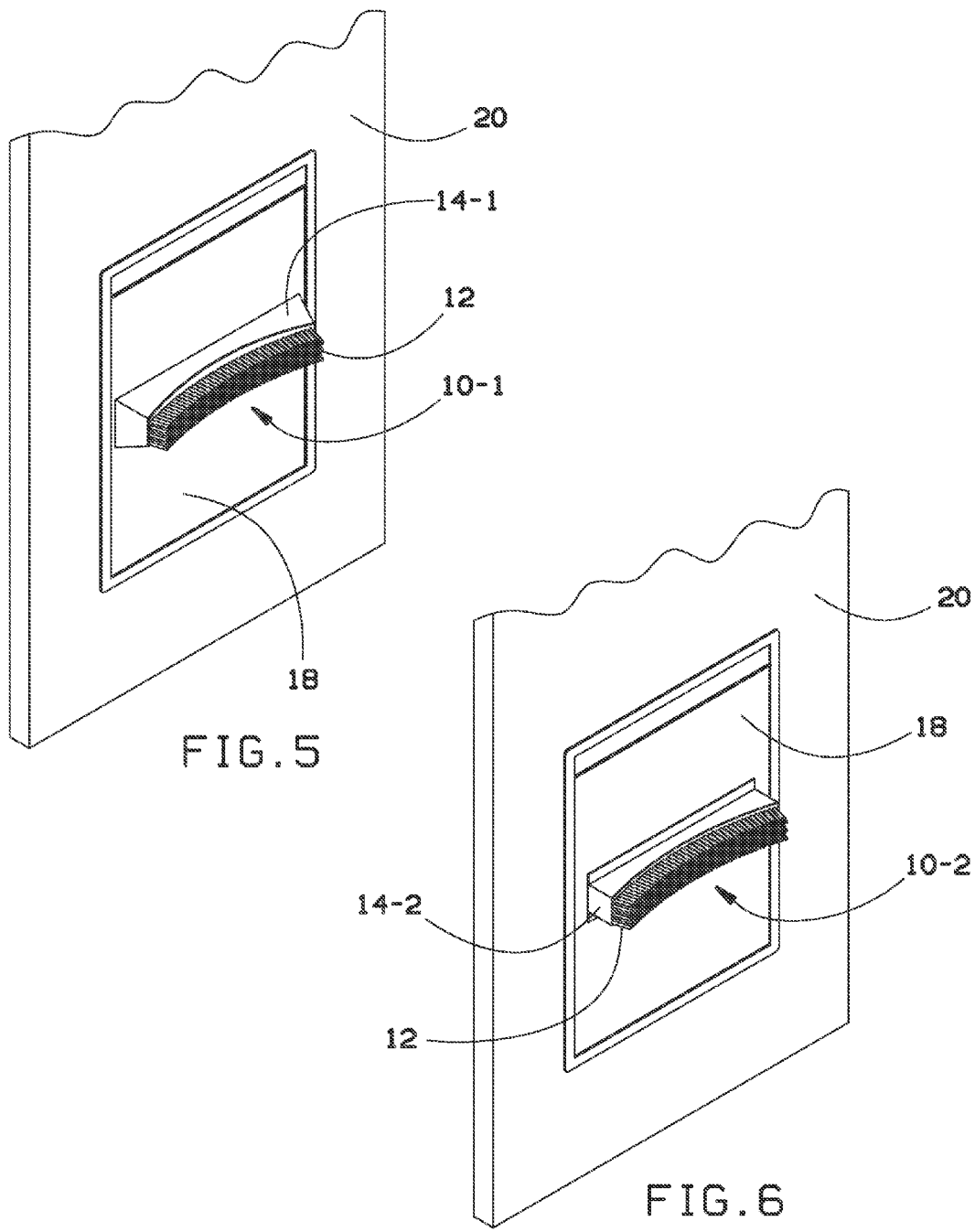

BRUSH ATTACHMENT FOR PET DOOR

BACKGROUND OF THE INVENTION

The present invention relates to pet grooming products and, more particularly, to a brush that may be mounted on a pet door for grooming a pet as they move through the pet door.

Various pet doors are available to allow a pet to come and go from a home as they choose. These pet doors are typically made of a flap that the pet may push open as they pass through the pet door.

When pets are outdoors, they often may get dirt, leaves, grass, allergens or other debris on them. When they come and go through the pet door, this debris may get tracked through the home.

As can be seen, there is a need for an apparatus for automatically cleaning a pet as the animal uses a pet door.

SUMMARY OF THE INVENTION

In one aspect of the present invention, a brush comprises a base; bristles attached to a first side of the base; and a mount adapted to be attached to a second side of the base, wherein the bristles have a concave arc exterior shape.

In another aspect of the present invention, a pet door comprises a pet door flap; and a brush attached to at least one side of the pet door flap, the brush comprises a base; bristles attached to a first side of the base; and a mount adapted to be attached to a second side of the base, wherein the bristles have a concave arc exterior shape.

These and other features, aspects and advantages of the present invention will become better understood with reference to the following drawings, description and claims.

BRIEF DESCRIPTION OF THE DRAWINGS

FIG. 5 is a perspective view of a pet door including a brush according to another embodiment of the present invention;

FIG. 6 is a perspective view of a pet door including a brush according to a further embodiment of the present invention.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, an embodiment of the present invention provides a brush that may be mounted on a typical flap-style pet door. As the pet uses the pet door, the brush may automatically sweep dirt, loose hair, leaves, grass, allergens, or other debris off the pet. The result may be both a cleaner pet and a cleaner house, as the debris may be brushed off the pet prior to the pet entering the house. The pet owner need not be present for the brush to reap its benefits.

Figure 1:
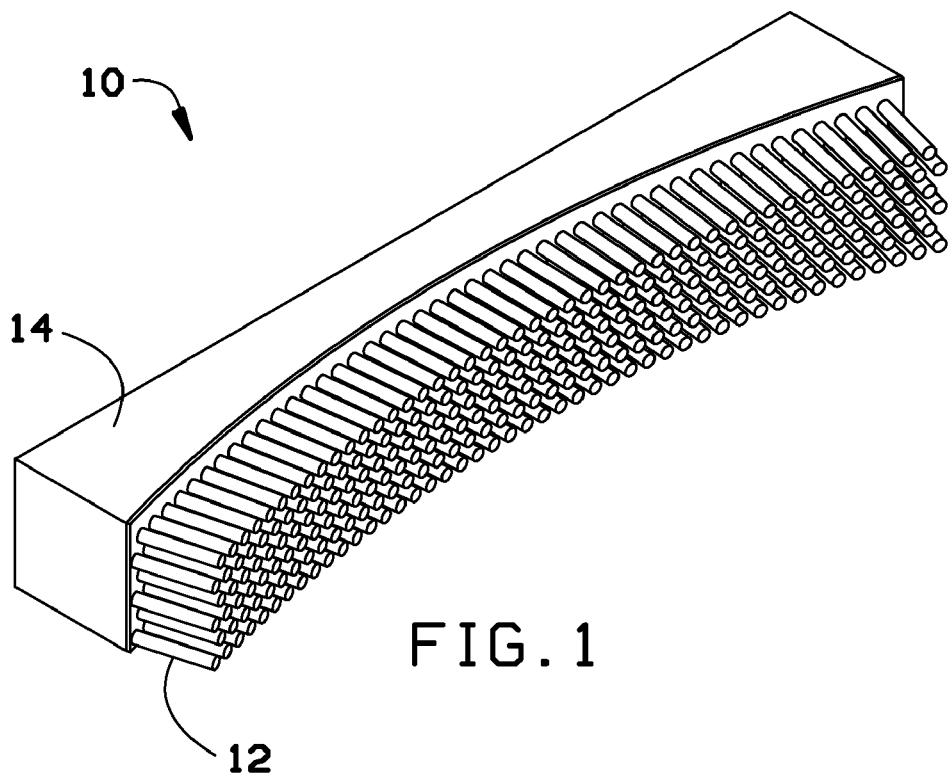
FIG. 1 is a bottom-side perspective view of a brush according to an embodiment of the present invention.
Figure 2:
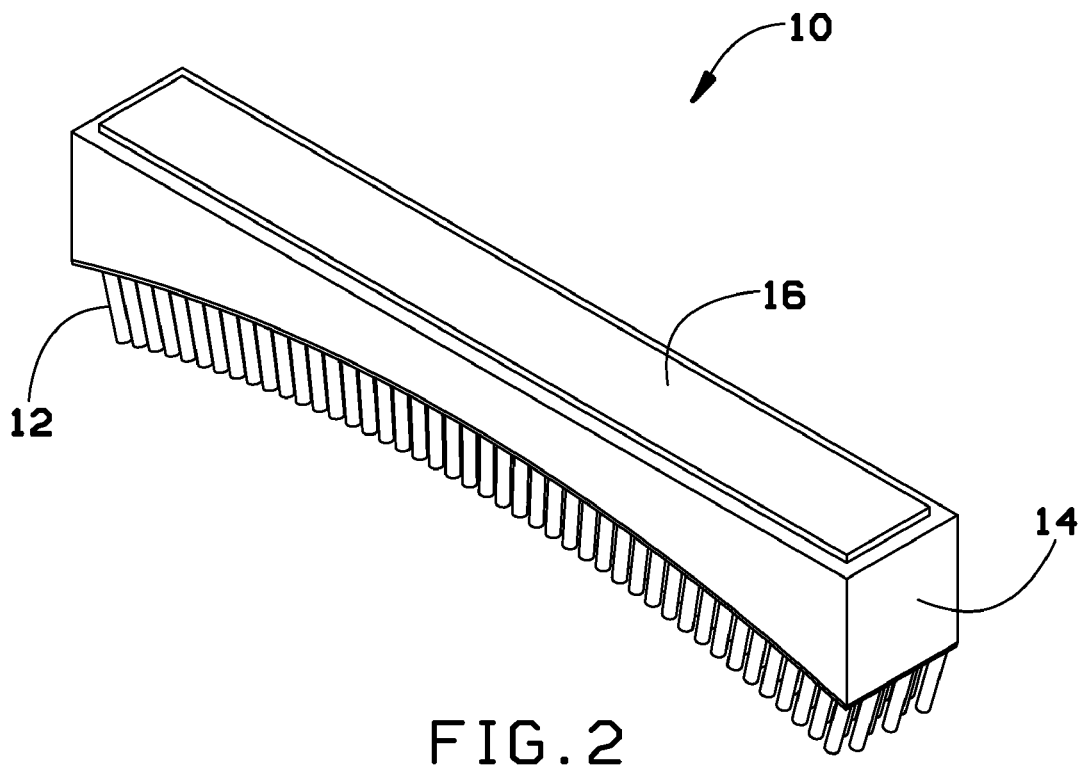
FIG. 2 is a top-side perspective view of the brush of FIG. 1.

Referring to FIGS. 1 and 2, there is shown a brush 10 according to an embodiment of the present invention. The brush may have a bristles 12 attached to a base 14. The bristles 12 may have an exterior shape of a convex arc. As discussed below, this convex arc shape may be realized, for example, by shaping the base 14 in the same convex arc shape and attaching the bristles 12 (each one having approximately the same length) to the base 14. Alternatively, this convex arc shape may be realized by varying the length of the bristles 12 attached to a rectangular shaped base 14. Optionally, a combination of both methods may be used to achieve the convex arc shape for the exterior of the bristles 12. The bristles 12 may be attached by known means, such as by attaching the bristles directly to the base with an adhesive, by forming the bristles on a flexible bristle base and attaching the bristle base onto the base 14, or by forming integral bristles with a bristle base and attaching the bristle base onto the base 14. Alternatively, the bristles 12 and the base 14 may be formed integrally as a single unit via, for example, injection molding.

A mount 16 may be formed on the side of the base 14 opposite to the side the bristles 12 are attached. The mount 16 may securely attach the base 14 to a surface, such as a pet door flap 18 (see FIG. 3). The mount 16 may include an adhesive and/or screws to permanently affix the brush 10 to the pet door flap 18. Alternatively, the mount 16 may removably secure the brush 10 to the pet door flap 18. For example, the mount 16 may include one side of a fastener, such as a hook and loop fastener or a ball and socket fastener, attached to the base 14 and another side of the fastener attached to the pet door flap 18.

Figure 3:
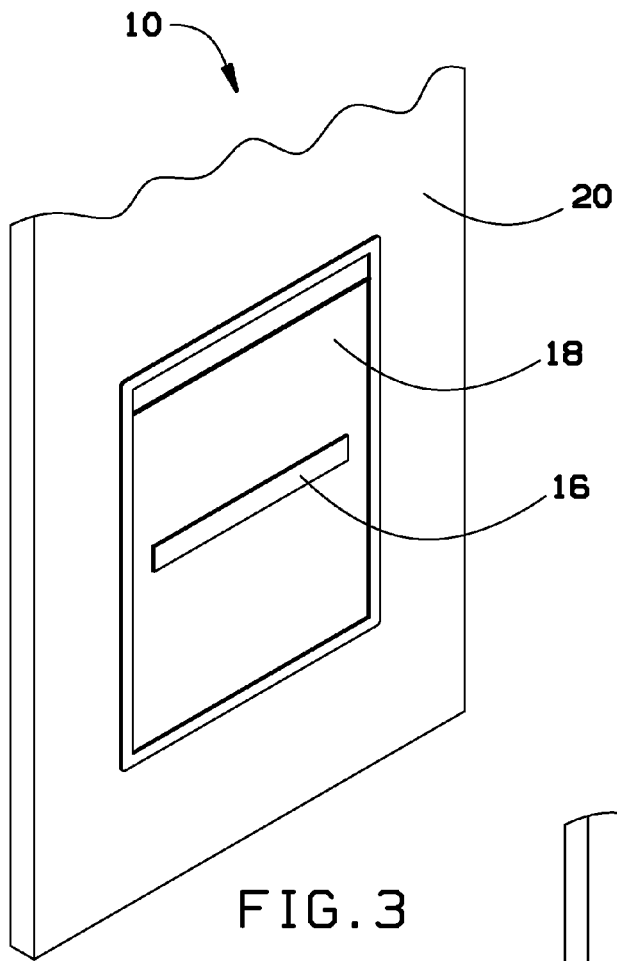
FIG. 3 is a perspective view of a pet door having a mounting strip attached thereto for mounting the brush of FIG. 1.
Figure 4:
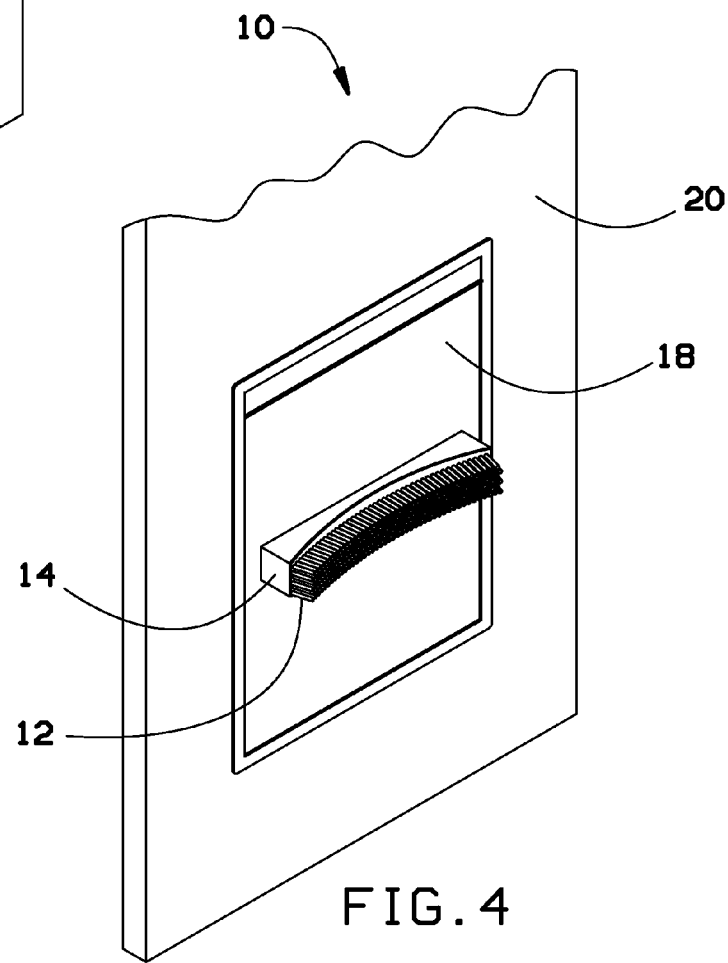
FIG. 4 is a perspective view of a pet door including the brush of FIG. 1.

FIG. 3 shows the pet door flap 18, mounted on a pet door 20, having one side of a fastener 16-1 attached to the pet door flap 18. The fastener 16-1 may be secured to the pet door flap 18 by, for example, an adhesive. FIG. 4 shows the brush 10 secured to the pet door flap 18. The brush 10 may be secured to either side of both sides of the pet door flap 18. Typically, the brush 10 is installed on an exterior side of the pet door flap 18 so that the debris brushed off the pet may be deposited outside after the pet comes inside.

Figure 7:
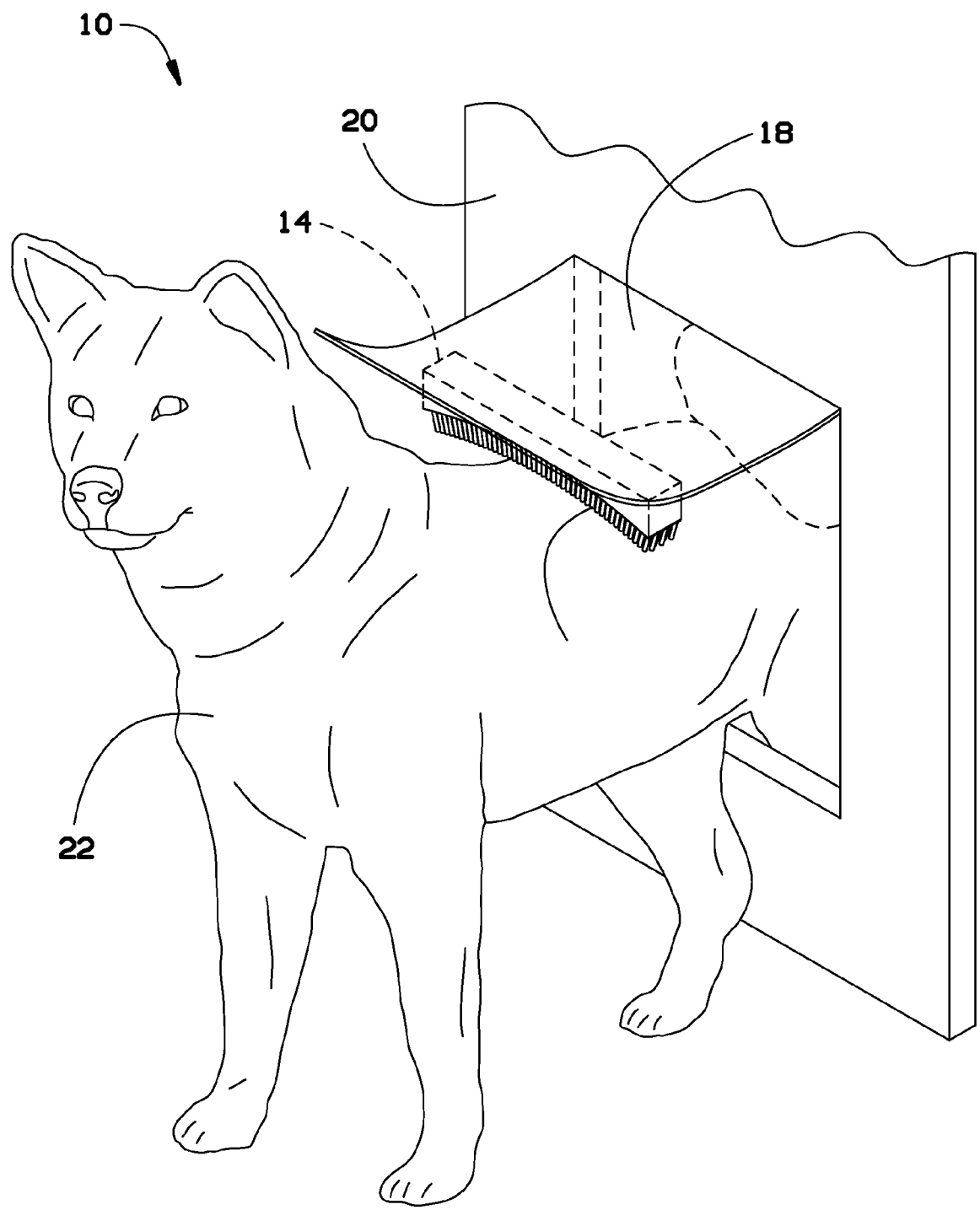
FIG. 7 is a perspective view of the pet door of FIG. 4 in use.

Referring to FIG. 5, there is shown a perspective view of a brush 10-1 according to an alternate embodiment of the present invention. The brush 10-1 may have a base 14-1 having a trapezoidal cross-section. The side of the base 14-1 that mounts on the pet door flap 18 may have a greater surface area than the side of the base 14-1 to which the bristles 12 attach. This greater surface area may help the base 14-1 stay attached to the pet door flap 18 when a pet 22 (see FIG. 7) passes through the pet door 20.

Referring to FIG. 6, there is shown a perspective view of a brush 10-2 according to another alternate embodiment of the present invention. The brush 10-2 may have a base 14-2 having a T-shape cross-section, wherein the base of the T-shape may be attached to the pet door flap 18. In this embodiment, the side of the base 14-2 that mounts on the pet door flap 18 may have a greater surface area that the side of the base 14-2 to which the bristles 12 attach. This greater surface area may help the base 14-2 stay attached to the pet door flap 18 when the pet 22 passes through the pet door 20.

While various brush shapes have been described above (such as the shape of the brushes 10, 10-1 and 10-2), the brush of the present invention may have any shape that may allow bristles to be attached to a pet door with a concave arc exterior shape. The length of the brush may span approximately the width of the pet door, as shown in FIGS. 4 through 6, and may typically be from about 6 to 12 inches long, typically about 8-10 inches long. The width of the brush may be from about 0.25 to about 10 inches, typically from about 1 to about 3 inches. The radius of curvature of the concave arc exterior shape of the bristles may approximate the curvature of a pet's back. The base of the brush may be made from, for example, plastic, such as ABS nylon. The bristles may be made from, for example, rubber.

While the pet door and the brush have been described as two different elements, the flap of the pet door and the brush could be made as a single integral unit. Alternatively, the base of the brush and the pet door flap may be made integrally as a single unit while the bristles may be a removable and replaceable item. The term "attached" as used herein to describe two elements attached to each other (such as the bristles attached to the base of the brush) may refer to the two elements being attached in manufacture to form an integral, one-piece design, to the two elements being attached together post-manufacture, as two distinct components being joined together.

It should be understood, of course, that the foregoing relates to exemplary embodiments of the invention and that modifications may be made without departing from the spirit and scope of the invention as set forth in the following claims.

I claim:

1. A brush comprising:
   a base having a first side and a second, opposite side, the second side being planar;
   bristles attached to the first side of the base; and
   a mount adapted to be attached to the second side of the base, the mount adapted to connect the second side of the base to a pet door,
   wherein the bristles form a concave arc exterior shape, and
   wherein the mount includes a first mount attached to the base and a second mount attached to the pet door, wherein the first mount is adapted to be affixed to the second mount.

2. The brush of claim 1, wherein the base has a rectangular cross section.

3. The brush of claim 1, wherein each of the bristles have approximately the same length.

4. The brush of claim 1, wherein the base has a trapezoidal-shaped cross section, wherein the area of the second side of the base is greater than the area of the first side of the base.

5. The brush of claim 1, wherein the base has a T-shaped cross section, wherein the area of the second side of the base is greater than the area of the first side of the base.

6. The brush of claim 1, wherein the bristles and the base are formed integrally as a single unit.

7. A pet door comprising:
   a pet door flap having a first side facing an exterior region and a second side facing an interior region;
   a brush attached to at least one of the first side and the second side of the pet door flap, the brush comprising:
      a base having a first side and a second, opposite side, the second side being planar;
      bristles attached to the first side of the base; and
      a mount adapted to be attached to the second side of the base the mount adapted to connect the second side of the base to at least one of the first side and the second side of the pet door,
   wherein the bristles form a concave arc exterior shape.

8. The pet door of claim 7, further comprising:
   a first mount attached to the base; and
   a second mount attached to the pet door, wherein the first mount is adapted to be affixed to the second mount.

9. The pet door of claim 8, wherein the second mount is attached to an exterior of the pet door.

10. The pet door of claim 7, wherein:
    the bristles are each of approximately the same length;
    the first side of the base has a concave arc shape; and
    the bristles are made of rubber.

11. The pet door of claim 7, wherein the base and the bristles are formed integrally as a single unit.

* * * * *